United States Patent

[11] 3,562,640

[72] Inventors James B. Wright;
James D. Holder, Huntsville, Ala.
[21] Appl. No. 791,416
[22] Filed Jan. 15, 1969
[45] Patented Feb. 9, 1971
[73] Assignee the United States of America, as represented by the Secretary of the Army

[54] APPARATUS FOR TESTING EXPLODING BRIDGEWIRE ORDNANCE DEVICES FOR CONTINUITY AND SHORTS
3 Claims, 1 Drawing Fig.

[52] U.S. Cl. .......................................................... 324/51
[51] Int. Cl. .......................................................... G01r 31/02
[50] Field of Search .......................................... 324/51-
—54, 73, 133, 115, 122, 62, 21—23, 28; 340/250, 252, 256; 323/79

[56] References Cited
UNITED STATES PATENTS
2,036,084 3/1936 Roder .............................. 323/79X
3,135,913 6/1964 Hodgdon ........................ 324/21

3,217,244 11/1965 Glover .............................. 324/51

Primary Examiner—Gerard R. Strecker
Attorneys—Harry M. Saragovitz, Edward J. Kelly, Herbert Berl and Aubrey J. Dunn ABSTRACT: A device wherein a first potential is applied to an exploding bridgewire unit (EBW), including a spark gap, to determine if the EBW unit is shorted. If the EBW unit is shorted a lamp will be lighted and locked on. If the lamp does not light, a switch is depressed which causes a charged capacitor to be connected in series with the EBW unit to check the continuity of the EBW. The charge of the capacitor is of a voltage sufficient to cause the spark gap of the EBW to break down and conduct if the EBW is otherwise continuous. If conduction through the EBW occurs, a lamp connected in series with the capacitor and the EBW will be ionized and locked on. If the EBW does not conduct, the charge of the capacitor will be dissipated in a manner which will cause yet another lamp to be ionized and locked on. Current through the EBW is limited to render the possibility of damage to or explosion of the EBW negligible.

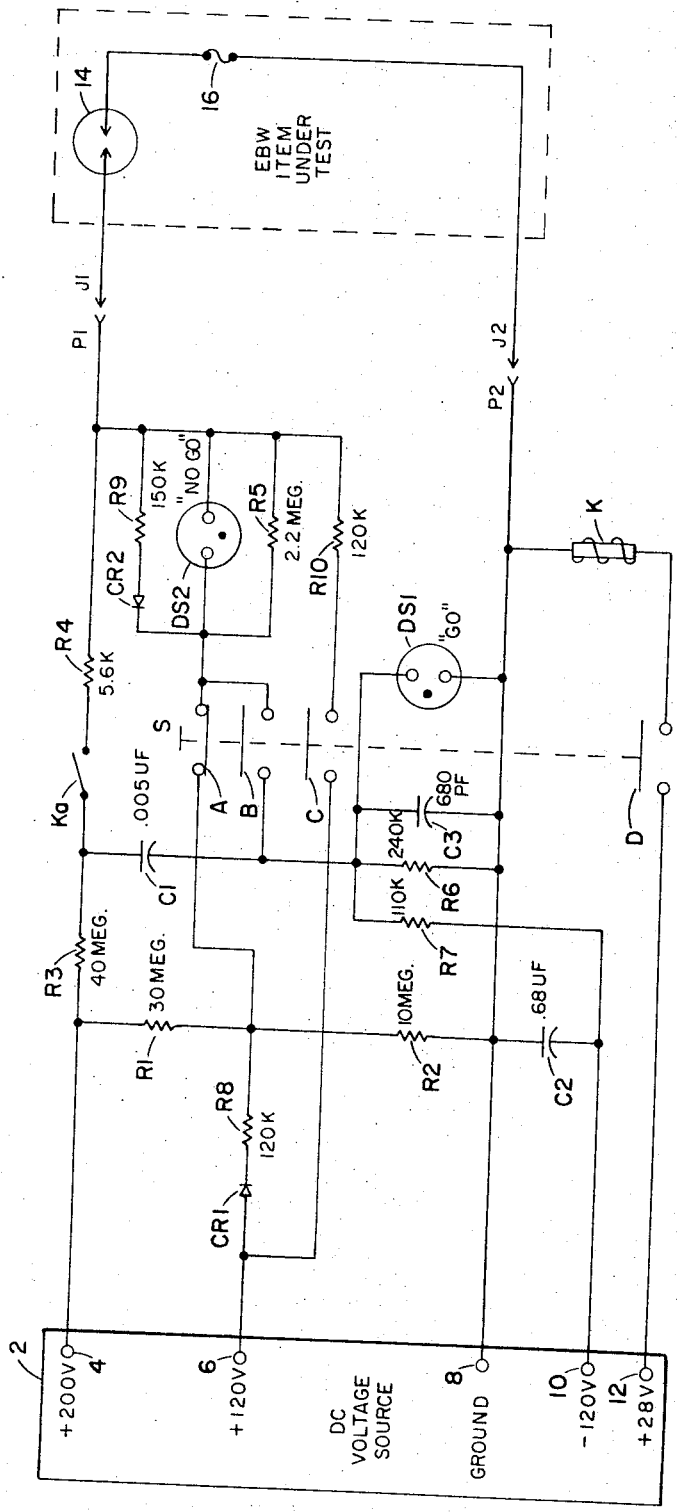

APPARATUS FOR TESTING EXPLODING BRIDGEWIRE ORDNANCE DEVICES FOR CONTINUITY AND SHORTS

Cross-Reference to Related Applications: This application is similar to my copending application Ser. No. 790,141 filed on Jan. 9, 1969, however, this invention is distinct therefrom. The invention herein is more sophisticated than the device disclosed in my copending application, in that indicator lamps having a lock on feature are used, and a charged capacitor is used to check the continuity of the unit under test.

BACKGROUND OF THE INVENTION

The nondestructive testing of ordnance items has in the past been a dangerous and delicate operation. In latter years, high energy firing systems, notably the exploding bridgewire concept, has reduced the physical danger considerably. The EBW unit, a high current, high voltage device, uses a series connected spark gap. This spark gap introduces an electrical discontinuity and prevents the use of ohmmeter-style testers. Several testing techniques have been tried with varying degrees of success.

SUMMARY OF THE INVENTION

In the present invention a voltage means in series with a neon lamp is shorted across the EBW. If the lamp lights, the EBW is shorted and therefore defective. Once the lamp has lit, it will normally remain lit.

If the lamp does not light, the continuity of the bridgewire may be tested. A switch is depressed which connects a charged capacitor in series with the EBW and a neon lamp. If the bridgewire is continuous the charge on the capacitor will cause the spark gap to break down and conduct. The lamp will light and lock on. If the bridgewire is discontinuous, the spark gap will not conduct and another lamp will light and lock on to indicate that the EBW is defective.

DESCRIPTION OF THE DRAWING

The single FIGURE drawing is a schematic diagram of the invention.

DESCRIPTION OF THE PREFERRED EMBODIMENT

The item under test, in this instance an exploding bridgewire unit, is connected at plugs P1 and P2. Switch S has normally open poles B,C, and D and pole A normally closed. Resistors R1 and R2 comprise a voltage divider network and are connected across terminals 4 and 8 of voltage source 2. The voltage developed across R2 is applied through pole A of switch S and resistor R5 to the exploding bridgewire unit EBW. If the EBW is shorted, a current will flow through pole A, resistor R5 and the unit under test to ground. The voltage developed across R5 will be sufficient to ionize lamp DS2. Once lamp DS2 ionizes it will lock on and remain lit until switch S is depressed. The conductive path DS2 will be from terminal 6 of voltage source 2, through diode CR1, resistor R8, contact A lamp DS2, and the EBW unit to ground. The DS2 will remain lit until S is depressed. If DS2 remains lit, a NO GO condition (defective unit) exists, and the unit is disgarded.

If DS2 does not light, it is then desired to test the continuity of the bridgewire 16. To check the continuity of the bridgewire switch S is depressed. Relay K, connected to terminal 12 of voltage source 2 through pole D of switch S, causes contact Ka to close shortly after switch S is depressed. The charge present on capacitor C1 is then applied across the EBW. Capacitor C1 is connected across terminals 4 and 8 of voltage source 2. The charge of C1 is sufficient to cause spark gap 14 of the EBW to break down and conduct. If the bridgewire 16 is continuous, current will flow through the EBW and resistors R4 and R6, Lamp DS1 (labeled GO) is connected in parallel with resistor R6. The voltage developed across R6 will cause DS1 to ionize. As soon as DS1 ionizes it will lock on and remain lit. The voltage at terminal 10 of voltage source 2, through resistor R7, holds lamp DS1 on once it has lit.

If the bridgewire is discontinuous, the charge stored on capacitor C1 is dissipated across the network R4, R5, R9 and diode CR2, and lamp DS2. When switch S was depressed lamp DS2 (labeled NO GO) was reconnected into the circuit to serve, if lit, as an indication of a failure of the EBW due to an open bridgewire. As the charge of C1 is dissipated through R9 and R5, enough voltage is developed across DS2 to cause it to ionize. As soon as DS2 ionizes, it will lock on from voltage supplied from terminal 6 of voltage source 2 through contact C of switch S, resistor R10 to DS2 and to ground through contact B of switch S. Capacitors C2 and C3 are for cross coupling and noise supression to prevent erroneous and ambiguous firing of the indicator lamps, DS1 and DS2. The values of components R6,R7, and C3 must be carefully chosen and are considered critical. This criticality may be relieved to some extent by the use of high-stability, shielded-type glow lamps rather than a standard NE–2H neon filled glow lamp.

I claim:

1. A test unit for testing the spark gap of an exploding bridgewire ordnance device for shorts and testing the series connection of the spark gap and bridgewire of an exploding bridgewire ordnance device for continuity comprising:
   a first and second output terminal;
   a DC voltage source having first and second output terminals at different potentials;
   a first and second lamp;
   a first and second resistor connected in series between said first and second output terminals of said voltage source;
   a third resistor;
   first means connecting said third resistor from between said first and second resistors to said first output terminal of said test unit;
   said second lamp being connected in parallel with said third resistor;
   a first capacitor and a fourth resistor connected in series between said first and second output terminals of said voltage source;
   said first lamp being connected in parallel with said fourth resistor;
   said second output terminals being connected together;
   said exploding bridgewire ordnance device adapted to be connected between said first and second output terminals of said test unit; and
   second means connecting said first output terminal of said voltage source to said first output terminal of said test unit.

2. A test unit as set forth in claim 1 wherein said first means connecting includes a multipole switch having a normally open pole and a first normally closed pole, and said second connecting means includes a relay having a normally open contact, and wherein said voltage source includes a third output terminal at a different voltage from said first and second output terminals of said voltage source, said first normally open pole of said switch being connected between said third output terminal and one of said relay, the other side of said relay being connected to said second output terminals;
   said contact of said relay connecting said first output of said voltage source to said first output of said test unit; and
   said normally closed contact of said switch being connected from between said first and second resistors to said second lamp.

3. A test unit as set forth in claim 2 wherein:
   said voltage source further includes fourth and fifth output terminals at different potentials from said first, second, and third output terminals of said voltage source and wherein said switch further includes a second and third normally open pole;
   a first diode having its anode connected to said fourth output terminal of said voltage source and its anode connected to a point between said first and second resistor;
   said first output of said test unit being connected to said fourth output terminal of said voltage source through said second normally open pole of said switch;

a second diode and a fifth resistor connected in series between said first output terminal of said test unit and a point between said second lamp and said normally closed contact of said switch, the cathode of said diode being connected to said normally closed pole;

said third normally open contact of said switch being connected from a point between said second lamp and said normally closed pole to a point between said first capacitor and said fourth resistor;

a sixth resistor connected between said fifth output terminal and said point between said first capacitor and said fourth resistor;

a second and third capacitor; and said second capacitor being connected between said second and fifth output terminals of said voltage source, said third capacitor being connected in parallel with said first lamp.